(12) United States Patent  
Bosch et al.

(10) Patent No.: US 11,405,438 B2  
(45) Date of Patent: Aug. 2, 2022

(54) MANAGING MULTICAST SERVICE CHAINS IN A CLOUD ENVIRONMENT

(71) Applicant: Cisco Technology, Inc., San Jose, CA (US)

(72) Inventors: Hendrikus Gp Bosch, Aalsmeer (NL); Jeffrey Napper, Delft (NL); Andre Surcouf, Val d'Oise (FR); Alessandro Duminuco, Milan (IT); Subhasri Dhesikan, San Jose, CA (US); Sape Jurriën Mullender, Amsterdam (NL)

(73) Assignee: Cisco Technology, Inc., San Jose, CA (US)

(*) Notice: Subject to any disclaimer, the term of this patent is extended or adjusted under 35 U.S.C. 154(b) by 375 days.

(21) Appl. No.: 15/968,690

(22) Filed: May 1, 2018

(65) Prior Publication Data

US 2019/0342354 A1    Nov. 7, 2019

(51) Int. Cl.
*H04L 65/611*    (2022.01)
*H04L 12/18*    (2006.01)
(Continued)

(52) U.S. Cl.
CPC ........ *H04L 65/4076* (2013.01); *H04L 12/185* (2013.01); *H04L 65/80* (2013.01); *H04L 67/10* (2013.01)

(58) Field of Classification Search
CPC .................................................. H04L 65/4076
See application file for complete search history.

(56) References Cited

U.S. PATENT DOCUMENTS 9,621,853 B1    4/2017 Yang et al.
10,469,376 B2 *    11/2019 Dowlatkhah ........... H04L 41/22
(Continued)

FOREIGN PATENT DOCUMENTS

CN    107005480 A    8/2017

OTHER PUBLICATIONS

Bernini, et al., "VNF Pool Orchestration For Automated Resiliency in Service Chains; draft-bernini-nfvrg-vnf-orchestration-04.txt", Internet Engineering Task Force, IETF; Standardworkingdraftt Internet Society (ISOC) 4, Apr. 10, 2017, pp. 1-16, retrieved on Apr. 10, 2017.

(Continued)

*Primary Examiner* — Jeffrey R Swearingen
(74) *Attorney, Agent, or Firm* — Lee & Hayes, P.C.

(57) ABSTRACT

Techniques for provisioning multicast chains in a cloud-based environment are described herein. In an embodiment, an orchestration system sends a particular model of a distributed computer program application comprising one or more sources, destinations, and virtualized appliances for initiation by one or more host computers to a software-defined networking (SDN) controller. The SDN controller determines one or more locations for the virtualized appliances and generates a particular updated model of the distributed computer program application, the updated model comprising the one or more locations for the virtualized appliances. The SDN controller sends the updated model of the distributed computer program application to the orchestration system. The orchestration system uses the particular updated model to generate a mapping of virtualized appliances to available host computers of the one or more host computers based, at least in part, on the particular updated model of the distributed computer program application. Using the mapping of virtualized appliances to (Continued)

available host computers, the orchestration system sends instructions for initiating the virtualized appliances on the available host computers to one or more cloud management systems.

20 Claims, 4 Drawing Sheets

(51) Int. Cl.
*H04L 65/80* (2022.01)
*H04L 67/10* (2022.01)

(56) References Cited

U.S. PATENT DOCUMENTS

| | | | | |
|---|---|---|---|---|
| 2003/0084156 | A1* | 5/2003 | Graupner | G06F 9/5088 709/226 |
| 2005/0039180 | A1* | 2/2005 | Fultheim | G06F 9/45533 718/1 |
| 2014/0317261 | A1 | 10/2014 | Shatzkamer et al. | |
| 2016/0248859 | A1* | 8/2016 | Jacquenet | H04L 41/0816 |
| 2019/0222511 | A1* | 7/2019 | Lokman | H04L 41/12 |
| 2019/0280935 | A1* | 9/2019 | Aftab | H04L 12/4641 |
| 2019/0286469 | A1 | 9/2019 | Lakshmikantha | |

OTHER PUBLICATIONS

PCT Search Report and Written Opinion dated Aug. 8, 2019 for PCT Application No. PCT/US2019/028974, 11 pages.

Chinese Office Action dated Oct. 25, 2021 for Chinese Patent Application No. 15/968,690.8, a foreign counterpart to U.S. Appl. No. 15/968,690, 5 pages.

* cited by examiner

MANAGING MULTICAST SERVICE CHAINS IN A CLOUD ENVIRONMENT

FIELD OF THE DISCLOSURE

The present disclosure is in the technical field of virtualization of media appliances in cloud-based distributed computing systems using software-defined networking. More specifically, the example embodiment(s) described below relate to generating optimal host computer placement decisions for virtualized media appliances in a multicast chain.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Professional media networks allow various media appliances, such as video cameras, video displays, video recorders, and mixing panels to communicate through dedicated coaxial or fiber cables. Broadcast and film studios generally use patch panels to allow devices to be connected to each other. The various media devices send signals to each other in a flow or service chain. These signals may be modified or augmented by devices in the service chain prior to being sent to the next device.

The Society of Motion Picture & Television Engineers (SMPTE) has published definitions of standards that allow the audio and video signals to be carried over Ethernet in internet protocol (IP) packets. Flows that previously were wired now may be performed over a generic IP network. Various types of packet flows, such as multicast flows, may be defined to enable sending devices to produce signals for zero or more receiving devices. With a multicast flow, a sending device uses a multicast label to announce availability of audio or video signals and a receiving device uses the multicast label to subscribe to the multicast tree, thereby allowing multiple devices to receive the signals from the sending device without duplication of the signals on the links over which they are transmitted.

The various flows or service chains may be managed by a software-defined network (SDN) controller which provisions switches and routers to support the flows between the various devices. Thus, the SDN controller could maintain information about the availabilities in the network as well as bandwidth of the different hosts.

In single-cloud or multi-cloud data centers, an orchestration system chooses the host on which to run the applications in a way that optimizes the utilization of these hosts. The allocations by the orchestration system would implicitly assign media streams to ports and links in the network and network switches.

While for most cloud-based systems, the implicit assignment of signals to ports and links in the network and network switches would not cause any main issues, the implicit assignment can create problems for media streams which can be negatively impacted by packet loss which occurs when a switch or port becomes overcommitted. Though the SDN controller could be the most aware of which ports or switches are available for optimal deployment, most cloud systems do not provide for an open interface between the cloud manager and the SDN controller.

Thus, there is a need for a system that allows the SDN controller and the system orchestrator to jointly make decisions regarding the placement of virtualized media appliances in a cloud-based system.

DETAILED DESCRIPTION

Figure 1:
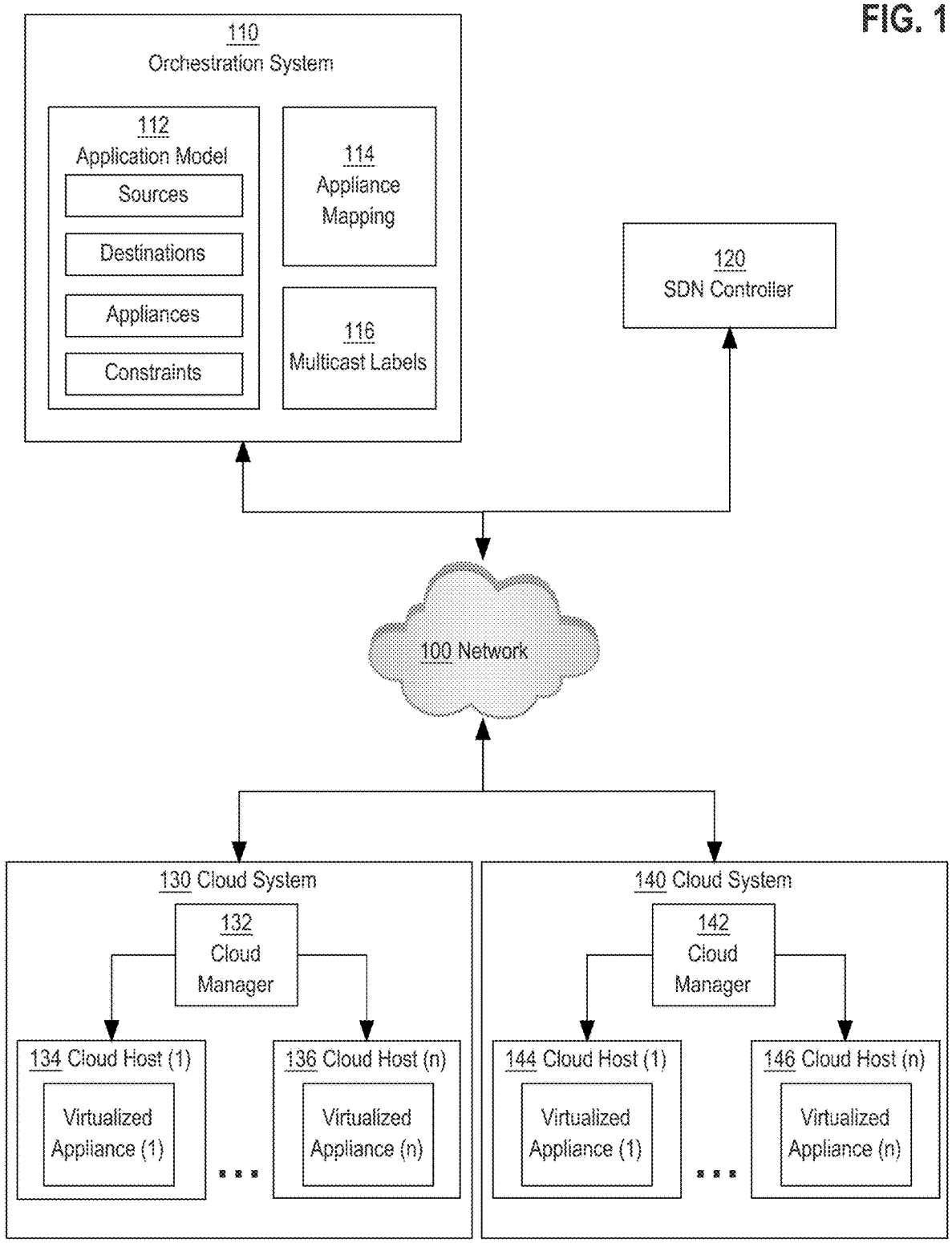
FIG. 1 depicts a schematic diagram of a cloud network for providing media workflows through virtualized appliances.

In the following description, for the purposes of explanation, numerous specific details are set forth in order to provide a thorough understanding of the present embodiments. It will be apparent, however, that the present embodiments may be practiced without these specific details. In other instances, well-known structures and devices are shown in block diagram form in order to avoid unnecessarily obscuring the present embodiments. Embodiments are described in sections below according to the following outline:

General Overview
Structural Overview
Functional Overview
Multicast Provisioning
Benefits of Certain Embodiments
Implementation Example—Hardware Overview
General Overview Techniques for provisioning multicast trees using an SDN controller and an orchestration system are described herein. In an embodiment, an orchestration system maintains an abstract model of a distributed computer program application which identifies sources, destinations, and virtualized appliances that need to be hosted in a virtualized environment and chained into media service chains. The orchestration system sends the abstract model to an SDN controller. The SDN controller determines hosts for the virtualized appliances such that the ports and links in the network and network switches do not become overcommitted. The SDN controller generates an updated model of the distributed computer program application which identifies the determined hosts for the appliances and sends the updated model of the distributed computer program application to the orchestration system. The orchestration system uses the updated model to generate a mapping of virtualized appliances to hosts. The orchestration system then sends instructions to a cloud manager to initiate the virtualized appliances on the mapped hosts.

In an embodiment, a method comprises sending, from an orchestration system to a software-defined networking (SDN) controller, a particular model of a distributed computer program application comprising one or more sources, destinations, and virtualized appliances for initiation by one or more host computers; determining, using the SDN controller, one or more locations for the virtualized appliances; generating, at the SDN controller, a particular updated model of the distributed computer program application, the updated model comprising the one or more locations for the virtualized appliances; sending, from the SDN controller to the orchestration system, the particular updated model of the distributed computer program application; generating, at the orchestration system, a mapping of virtualized appliances to available host computers of the one or more host computers based, at least in part, on the particular updated model of the distributed computer program application; using the mapping of virtualized appliances to available host computers, sending, from the orchestration system to one or more cloud management systems, instructions for initiating the virtualized appliances on the available host computers.

Structural Overview

FIG. 1 depicts a schematic diagram of a cloud network for providing media workflows through virtualized appliances.

FIG. 1 includes an orchestration system 110, a software-defined networking SDN controller 120, and cloud systems 130 and 140 communicatively coupled over network 100. Network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The orchestration system 110 software-defined networking (SDN) controller 120, and cloud systems 130 and 140, and other elements of the system may each comprise an interface compatible with the network 100 and are programmed or configured to use standardized protocols for communication across the networks such as TCP/IP, and higher-layer protocols such as HTTP, TLS, and the like.

Orchestration system 110 may be implemented using a server-class computer or other computers having one or more processor cores, co-processors, or other computers. Orchestration system 110 may be a physical server computer and/or a virtual server instance stored in a data center, such as through cloud computing. Additionally or alternatively, orchestration system 110 may comprise one or more applications executing on a server computer system which comprises instructions for an application model 112, an appliance mapping 114, and multicast labels 116.

Orchestration system 110 is programmed or configured to maintain abstract models for a distributed computer program application. The distributed computer program application may comprise a professional media workflow, including input devices, such as cameras and microphones, output devices, such as visual displays, and other appliances, such as video switchers and mixing panels. In an embodiment, the application model 112 comprises the inputs and outputs of the system and the set of appliances that need to be hosted in a virtualized environment.

The input devices or sources may include initial capture devices while the destinations or output devices may include the ends of the signal flows. The virtualized appliances may include various media appliances, such as video/audio switchers, video/audio recorders and video/audio mixers, which are programmed or configured to perform one or more operations on audio and/or video signals and produce one or more outputs. For example, a first appliance may modify an audio input to reduce background noise while a second appliance matches audio signals to video signals.

The application model 112 may identify one or more service chains which include one or more appliances. In an embodiment, physical media appliances are replaced by virtualized appliances, such as through a bare-metal environment, a virtual machine, and/or a container run in a cloud environment. A service chain, as used herein, refers to a processing flow whereby a signal is sent from a first device to a second device, modified or utilized by the second device, and then sent to a third device. In terms of the cloud environment, service chains may be defined that specify one or more sources or inputs, one or more virtualized appliances hosted in the cloud environment, and one or more end destinations or outputs.

In an embodiment, the service chains comprise one or more multicast chains. A multicast chain, as used herein, is a service chain where one or more devices provide their data to a multicast tree. Any number of devices may subscribe to the multicast tree to receive the provided data. Those devices may then provide data to their own multicast trees to which other devices subscribe.

The application model 112 may additionally comprise one or more constraints. The one or more constraints may include rules restricting allocation of media streams to ports and/or links in the network and network switches. Additionally or alternatively, the one or more constraints may include rules restricting allocation of virtualized media appliances to hosts. For example, a particular virtualized media appliance may require at least 6 gigabytes (GB) of RAM. Thus, a constraint in application model 112 may indicate that the particular virtualized media appliance may only be hosted on a host computer with at least 6 GB of available RAM. As another example, the application model 112 may identify required programs and/or applications for different virtualized appliances.

Appliance mapping 114 comprises a mapping of appliances to locations for the appliances. For example, appliance mapping 114 may include a mapping of appliances to host computing devices. Additionally or alternatively, appliance mapping 114 may comprise a more generalized mapping. For example, appliance mapping 114 may include a mapping of appliances to availability zones of host computers. An availability zone, as used herein refers to a plurality of host computing devices that are usable by the cloud management system for selection. Appliance mapping 114 may additionally or alternatively include a mapping of switches and/or ports to data streams.

In an embodiment, each multicast tree may be defined by a multicast label. A provider of an input stream may announce the availability of content by sending a message with a multicast label. The virtualized media appliances provisioned to receive data from the multicast tree may subscribe to the multicast tree using the same multicast label. Orchestration system 110 may assign multicast labels 116 to the data streams.

SDN controller 120 comprises a system that manages flows between switches and routers. The SDN controller may be an application stored on the orchestration system and/or stored on a separate computing device. The SDN controller 120 may communicate with networked devices using application programming interfaces (API). The SDN controller 120 may perform a variety of network tasks, such as identifying which devices are in the network, the capabilities of the devices, gathering network statistics, and/or executing rules to determine optimal allocation of resources throughout the network. The SDN controller 120 may be further programmed or configured to manage the multicast trees and to provision non-blocking routes for the multicast chains through multicast-capable switches and/or routers.

Cloud systems 130 and 140 comprise a plurality of cloud hosts 134, 136 and 144, 146 respectively which are programmed or configured to host one or more virtualized appliances. Each of cloud systems 130 and 140 may include a cloud manager 132, 142 which are programmed or configured to manage the plurality of cloud hosts. FIG. 1 depicts a multi-cloud environment where the orchestration system 110 communicates with cloud managers 132 and 142 of cloud systems 130 and 140 for the purpose of demonstrating the use of the system in a multi-cloud environment. In alternative embodiments, the virtualized media appliances are hosted through a single cloud system.

Computer executable instructions described herein may be in machine executable code in the instruction set of a CPU and may have been compiled based upon source code written in JAVA, C, C++, Python, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the systems described herein.

FIG. 1 depicts orchestration system 110, SDN controller 120, and cloud systems 130 and 140 as distinct elements for the purpose of illustrating a clear example. However, in other embodiments, more or fewer computers may accomplish the functions described herein. For example, the orchestration system and the SDN controller may comprise applications executing on a single server computer. Additionally or alternatively, cloud system 130 may include multiple virtual servers stored on one or more devices and/or separate server computers.

Multicast Provisioning

Figure 2:
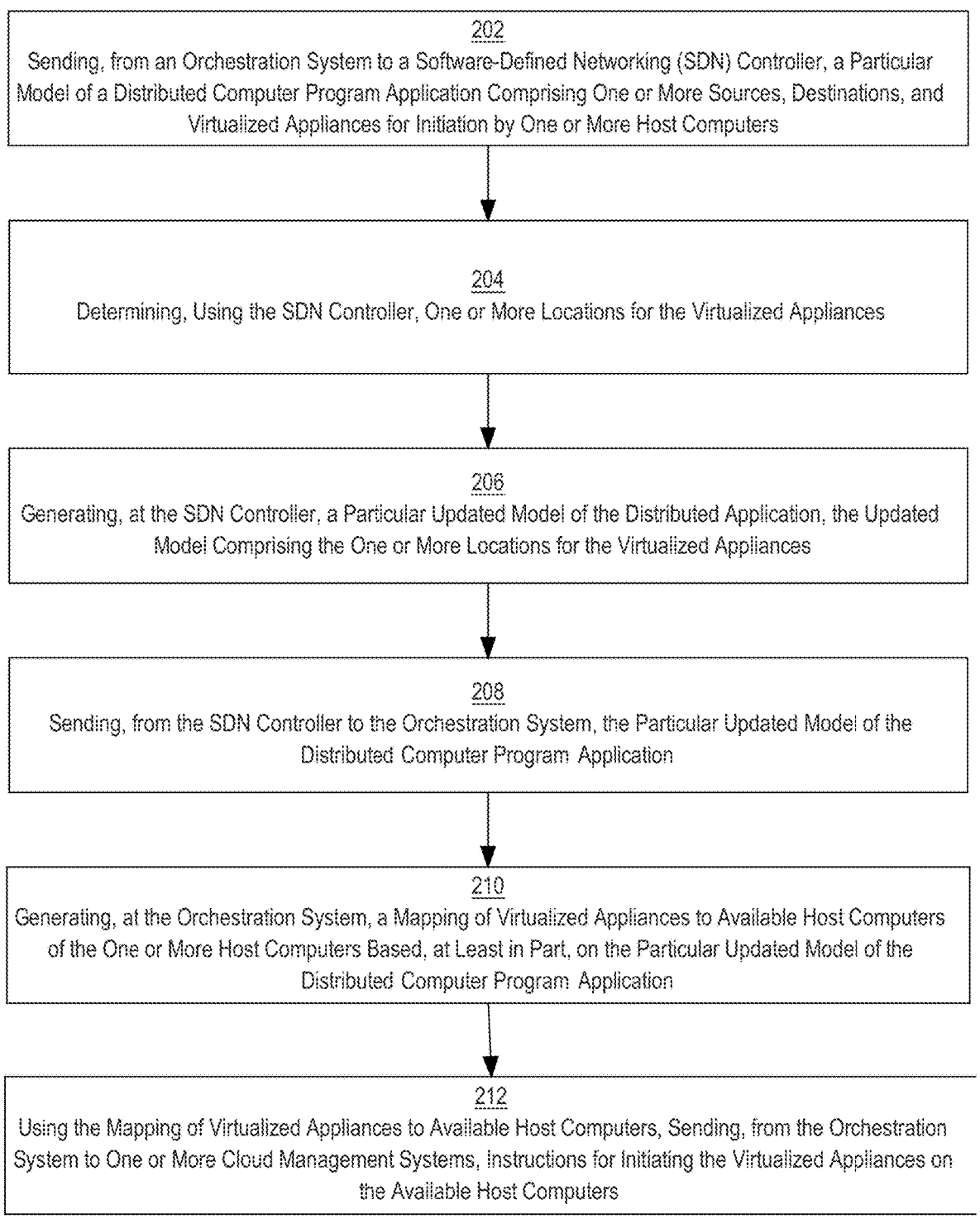
FIG. 2 depicts an example method for managing multicast chains in a cloud based environment.

FIG. 2 depicts an example method for managing multicast chains in a cloud based environment.

At step 202, an orchestration system sends a particular model of a distributed computer program application comprising one or more sources, destinations, and virtualized appliances for initiation by one or more host computers to an SDN controller. The model may describe sources of media streams, appliances for utilizing the media streams, and final destinations of the media streams. In an embodiment, the orchestration system sends multicast labels for each segment of the service chain. The model may additionally include one or more constraints which restrict placement of appliances on host machines and/or media streams on switches or ports.

At step 204, the SDN controller determines one or more locations for the virtualized appliances. For example, the SDN controller may determine Ethernet switches and/or ports that are best suited to host the appliances. The SDN controller may base the determination of switches and/or ports on the model of the distributed computer program application and on the SDN's knowledge of the network. For example, the SDN controller may store data identifying availability of Ethernet switches, the host computing devices in the network, the applications currently executing on the host computing devices, and/or the available bandwidth of the host computing devices. The SDN may use the stored network data to identify switches for receiving input streams and/or host computers for executing applications.

In an embodiment, determining the one or more locations for the virtualized appliances comprises provisioning appliances in a multicast service chain. For example, the SDN controller may identify a first host for provisioning a first appliance in a multicast chain which receives media input from a media source, such as a recording device. The SDN controller may then identify each subsequent appliance in the multicast tree and identify hosts for each subsequent appliance and switches for interactions between the different hosts.

The SDN controller may determine hosts for the virtualized appliances based on available bandwidth of the hosts. For example, the SDN controller may communicate with the various host computing devices through the host APIs. As another example, the SDN controller may receive bandwidth data from the switch to witch the host is attached. The SDN controller may request data indicating available bandwidth for the host computing devices. The SDN controller may additionally determine a required bandwidth for each appliance. For example, the model of the distributed computer program application may identify bandwidths for each appliance. Based on the required bandwidths in the model of the distributed computer program application and the available bandwidths of the host computing devices, the SDN controller may identify, for each appliance, one or more host computing devices that have enough available bandwidth to host the appliance without packet loss.

The SDN controller may determine hosts for the virtualized appliances based on capabilities of the hosts. For example, the SDN controller may store data describing hardware and/or software for one or more host computing devices. The SDN controller may determine required and/or optimal hardware and/or software for hosting one or more of the virtualized appliances identified in the model of distributed computer program application. For example, the model of the distributed computer program application may include constraints indicating required and/or optimal hardware and/or software for the one or more virtualized appliances. As another example, the SDN controller may store data indicating required and/or optimal hardware and/or software for different types of virtualized appliances which may be utilized to determine required and/or optimal hardware and/or software for virtualized appliances in the model of the distributed computer program application. Based on the stored data describing hardware and/or software for the host computing devices and the determination of required and/or optimal hardware and/or software for the virtualized appliances, the SDN controller may select host computing devices which comprise the required and/or optimal hardware and/or software for each virtualized appliance.

In an embodiment, the SDN controller identifies a plurality of options for switches, ports, and/or host computing devices. For example, if the SDN controller determines that a first appliance could be optimally hosted on either of a plurality of host computing devices, the SDN controller may select each of the plurality of host computing devices as options. The SDN controller may further indicate additional restrictions. For example, if a first host computing device is included in a set of selections for both a first appliance and a second appliance, the SDN controller may indicate whether the first host computing device is capable of hosting both appliances simultaneously or whether the first host computing device is only capable of hosting one of the appliances.

In an embodiment, the SDN controller places reservations on switches, ports, and/or host computing devices that are selected to host the virtualized appliances. For example, if the SDN controller selects a first port for a first virtualized appliance, the SDN controller, may store data indicating that the first port has been reserved and cannot be used for anything other than the virtualized appliance. The SDN controller may send a message to the cloud management system indicating that the first port has been reserved for the virtualized appliance so that cloud management system does not assign additional services to the first port. The SDN controller may wait a predetermined period of time after reserving the switches, ports, and/or host computing devices. If the SDN controller has not received data indicating that the switches, ports, and/or host computing devices have been provisioned for the virtualized appliance within the predetermined period of time, the SDN controller may release the reservation on the port.

At step 206, the SDN controller generates a particular updated model of the distributed computer program application, the updated model comprising the one or more locations for the virtualized appliances. For example, the SDN controller may append to the model of the distributed computer program application, data identifying the switches, ports, and/or host computing devices for each of the virtualized appliances.

At step 208, the SDN controller sends the particular updated model of the distributed computer program application to the orchestration system. In an embodiment, the orchestration system may determine whether it is able to map virtualized appliances to switches, ports, and/or host computing devices as prescribed by the updated model of the distributed computer program application. For example, the orchestration system may determine that one or more of the selected host computing devices are unable to host a corresponding virtualized appliance. In response, the orchestration system may update the model of the distributed computer program application with one or more additional constraints and resend the model to the SDN controller. The additional constraints may specify systems that were unable to be provisioned per the updated model received by the SDN controller.

At step 210, the orchestration system generates a mapping of virtualized appliances to available host computers of the one or more host computers based, at least in part, on the particular updated model of the distributed computer program application. For example, the orchestration system may map the virtualized appliances to availability zones, or groups of available hosts, in each of the cloud systems. The orchestration system is thus able to further restrict the selected hosts from the SDN controller to a set of appropriate hosts from the managed cloud systems At step 212, using the mapping of virtualized appliances to available host computers, the orchestration system sends, to one or more cloud management systems, instructions for initiating the virtualized appliances on the available host computers. For example, the orchestration manager may send instructions which identify the name of an application to run, all starting configuration parameters, and the availability zones representing hosts the can be used to schedule the application onto. The message may additionally include the multicast labels for each virtualized appliance that is managed by the cloud management system.

In a multi-cloud system, the orchestration system may send a message to each cloud management system with instructions for initiating the virtualized appliances on the available host computers managed by the system. Thus, if a first appliance is to be initiated in a first cloud system and a second appliance is to be initiated in a second cloud system, the orchestration system may send a first message to a first cloud management system identifying the first appliance and a second message to a second cloud management system identifying the second appliance.

By allowing the SDN controller to pre-select switches, ports, and/or host computing devices, the orchestration system allows the SDN controller to optimize the distributed computer program application in a manner that is responsive to bandwidth of the host computing devices and that can be used to avoid packet loss in transmission.

Multicast Application

Figure 3:
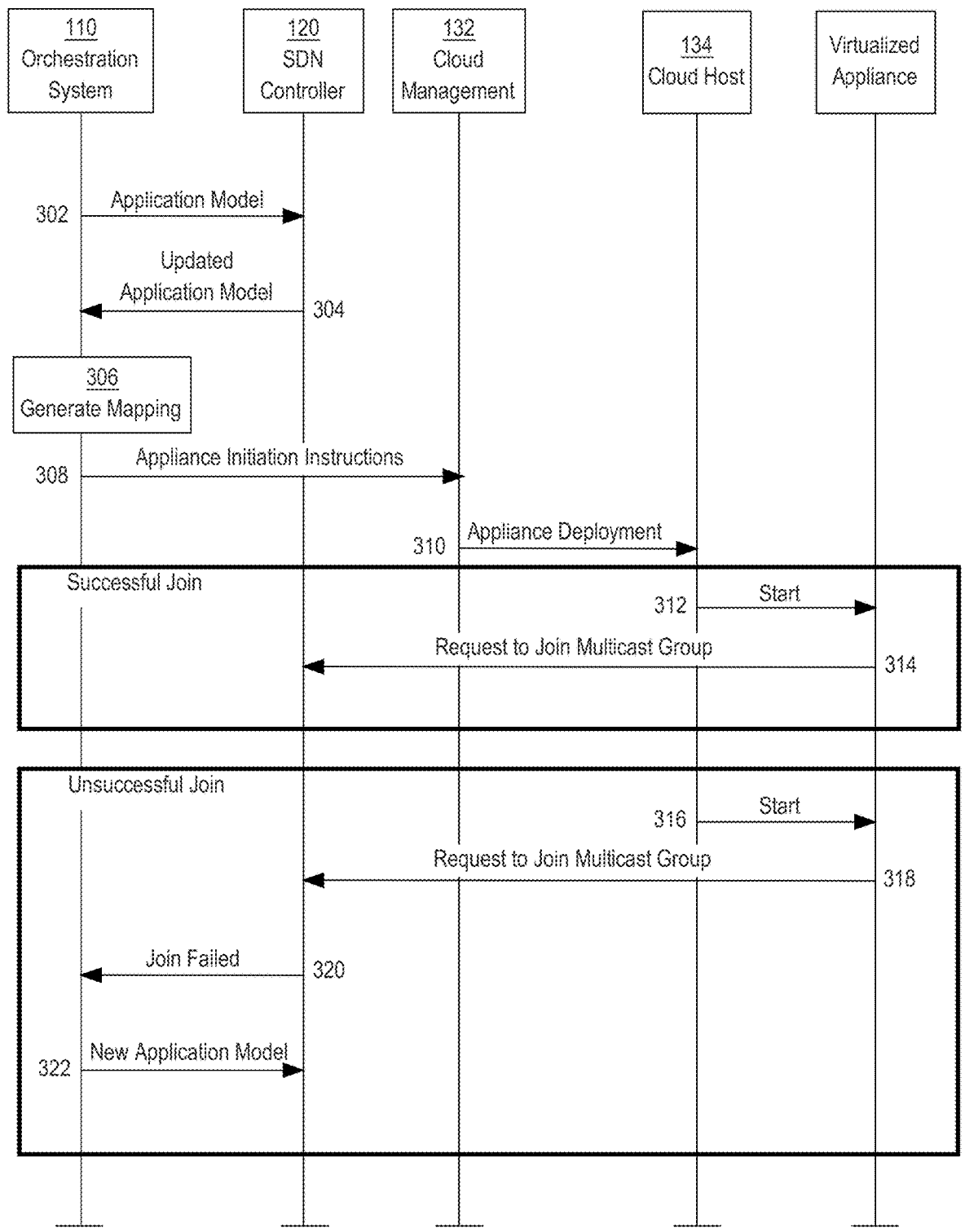
FIG. 3 is a message diagram depicting interactions between an orchestration system, an SDN controller, a cloud management system, a cloud host, and a virtualized appliance.

FIG. 3 is a message diagram depicting interactions between an orchestration system, an SDN controller, a cloud management system, a cloud host, and a virtualized appliance.

At step 302, the orchestration system sends the application model to the SDN controller. The orchestration system may send the application model over a network, such as network 100, or through a separate connection. For example, the orchestration system and application model may comprise software applications executing on the same computing device. The application model identifies the sources, destinations, and appliances that need to be started on the cloud systems.

The application model may additionally include additional constraints that limit the SDN controller's selection. The constraints may allow the orchestration system to specify requirements for appliances, switches, or ports in order to improve performance or ensure that the SDN controller does not create a selection that the orchestration system is unable to implement. Additionally or alternatively, the constraints may allow the orchestration system to reduce the selection opportunities for the SDN controller, thereby increasing the responsive speed of the SDN controller.

At step 304, the SDN controller returns an updated application model to the orchestration system. The updated application model may include selections of switches, ports, and/or host computing devices made by the SDN controller based on the application model received by the orchestration system.

At step 306, the orchestration system generates a mapping of appliances to cloud hosts. The orchestration system generates the mapping based on the selections in the updated model. If the orchestration system is unable to generate a mapping based on the selections from the SDN controller, the orchestration system may reorganize its multi-cloud system and/or send a new application model to the SDN controller with one or more additional constraints.

At step 308, the orchestration system sends appliance initiation instructions to cloud management. The appliance initiation instructions may identify the application to be executed, the type of system to be executed on, initial configuration data, whether the appliance is receiving and/or sending data, one or more multicast labels identifying multicast groups to which the appliance will subscribe, and/or one more multicast labels for the multicast provided by the appliance.

At step 310, the cloud management system sends appliance deployment instructions to a cloud host. For example, the cloud management system may select the appropriate host based on the instructions from the orchestration system. The cloud management system may send instructions to the host to start the application.

Steps 312-314 depict an example message diagram when the cloud host is able to successfully join the multicast group. At step 312, the cloud host starts the virtualized appliance. For example, the host computing device may initiate the application as specified by the instructions sent from the orchestration system. The cloud host may load the initial configuration parameters into the application.

At step 314, the virtualized appliance sends a request to join the multicast group to the SDN controller. For example, as part of initiating the application, the host computing device needs to subscribe to one or more multicast groups. The virtualized appliance may send a message to the SDN controller, such as an internet group management protocol (IGMP) message, which includes a multicast label and an indication that the appliance needs to join the multicast group associated with the multicast label.

The SDN controller may intercept the message from the virtualized appliance and process the message by provisioning the multicast trees as maintained by the relevant switches and/or multicast routers. The SDN controller may additionally provision security rules for the multicast tree and/or monitor the multicast flows. After the SDN controller completes the provisioning of the multicast trees, the virtualized appliance is able to begin receiving data from the multicast tree and/or publishing data through its own multicast trees.

Steps 316-322 depict an example message diagram when the cloud host is unable to successfully join the multicast group. At step 316, the cloud host starts the virtualized appliance. For example, the host computing device may initiate the application as specified by the instructions sent from the orchestration system. The cloud host may load the initial configuration parameters into the application.

At step 318, the virtualized appliance sends a request to join the multicast group to the SDN controller. For example, as part of initiating the application, the host computing device needs to subscribe to one or more multicast groups. The virtualized appliance may send a message to the SDN controller, such as an internet group management protocol (IGMP) message, which includes a multicast label and an indication that the appliance needs to join the multicast group associated with the multicast label.

At step 320, the SDN controller sends a message to the orchestration system indicating that the join failed. For example, if the SDN controller does not place reservations on the pre-selected ports, then the port for the virtualized appliance may be in use prior to the initiation of the virtualized appliance, thereby putting the system at risk of packet loss during streaming. If the SDN controller determines that it is unable to support the appliance on the selected host, the SDN controller may send a message to the orchestration system which indicates that the virtualized appliance was unable to join the multicast group.

At step 322, the orchestration system sends a new application model to the SDN controller. For example, in response to receiving the join-failure message, the orchestration system may generate a new model for the distributed computer program application with a constraint that indicates the failed host is not able to support the virtualized appliance. The method may then begin anew with the SDN controller generating a new updated model for the distributed computer program application subject to the new constraint. Additionally or alternatively, the orchestration system may send the prior model with the new constraint, thereby allowing the SDN controller to only update parts of the distributed computer program application that need to be updated.

In embodiments, the system provisions appliances that subscribe to a plurality of multicast groups and/or produce signals for a plurality of multicast groups. Thus, the SDN controller may identify appropriate switches or ports such that a virtualized appliance, such as a multi-viewer media application, is able to join a plurality of multicast groups. If any of the joins fail, the system may perform the same recovery procedure described in steps 316-322.

In an embodiment, the orchestration system continuously updates the deployment for continued optimization. For example, the orchestration system may receive requests to start other distributed computer program applications. The orchestration system may send a new model for the new distributed computer program applications along with the prior model of the currently running distributed computer program application. The SDN controller may determine which provisioned ports need to be freed up to allow the new distributed computer program application to run. The SDN controller may submit altered models to the orchestration system which include indications of which virtualized appliances need to be redirected. The orchestration system may send the instructions to the cloud management system with additional instructions that the re-provisioned hosts should detach from the multicast tree and the new hosts should subscribe to the multicast tree.

Benefits of Certain Embodiments

The systems and methods described herein provide improvements to professional media workloads. By using the SDN controller to identify switches, ports, and/or host computing devices for running the virtualized appliances, the system is able to make placement decisions which take into account available bandwidth and other network considerations, thereby ensuring that data transmission can be performed for virtualized appliances without suffering packet loss. Thus, the systems and methods described herein improve the functioning of the computing systems by reducing packet loss and increasing overall performance.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
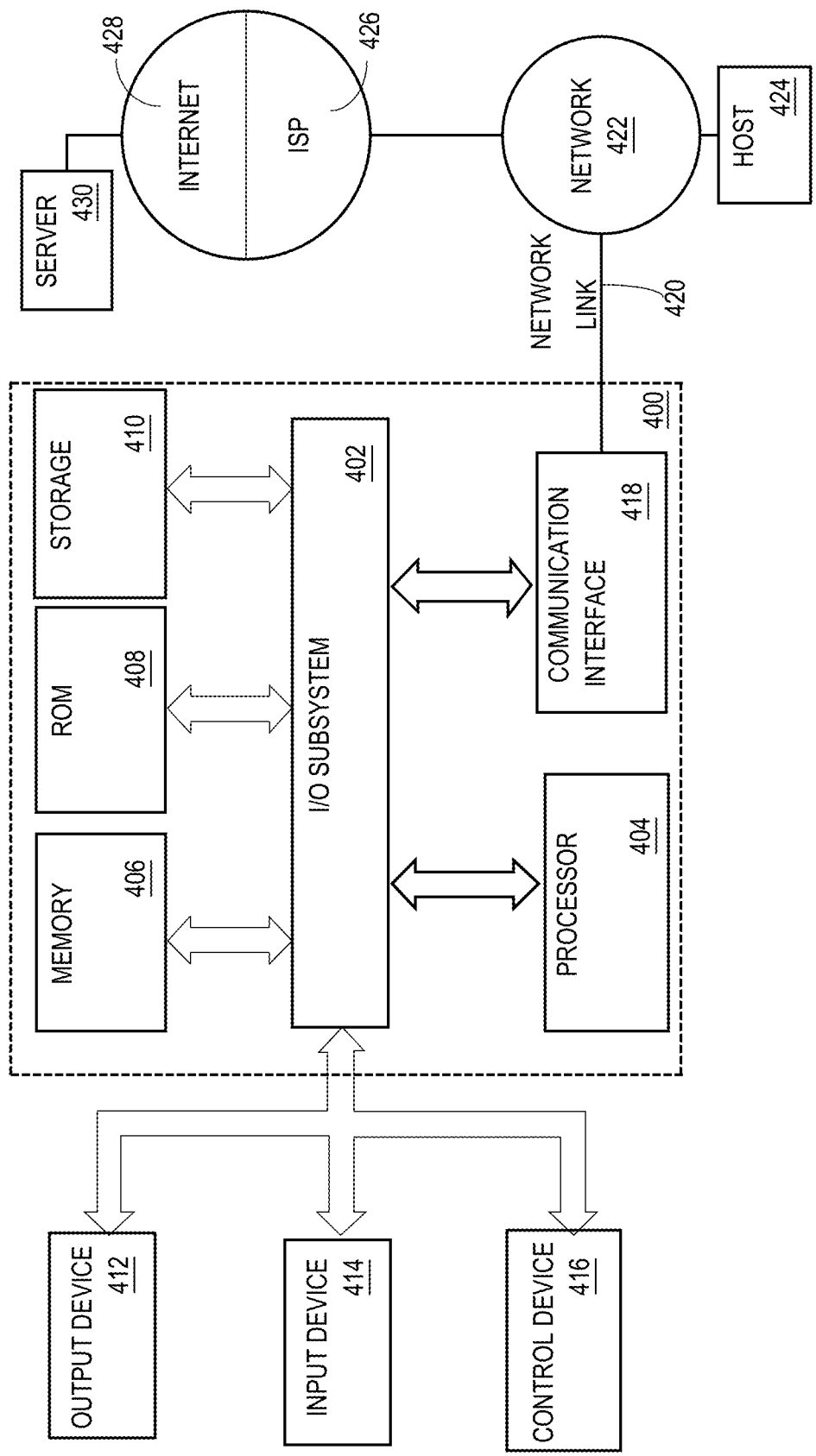
FIG. 4 is a block diagram that illustrates an example computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device (e.g., display) 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
    sending, from an orchestration system to a software-defined networking (SDN) controller, a model of a distributed computer program application representing one or more sources, destinations, and virtualized appliances for initiation by one or more host computers;
    determining, using the SDN controller, one or more host computers at which to host the virtualized appliances;
    identifying a first host computer, of the available host computers, for executing a first application and a second host computer, of the available host computers, for executing a second application;
    generating, at the SDN controller, an updated model of the distributed computer program application, the updated model indicating the one or more host computers at which the virtualized appliances are to be hosted;
    sending, from the SDN controller to the orchestration system, the updated model of the distributed computer program application;
    generating, at the orchestration system, a mapping of the virtualized appliances to available host computers of the one or more host computers based, at least in part, on the updated model of the distributed computer program application; and
    using the mapping of the virtualized appliances to the available host computers, sending, from the orchestration system to one or more cloud management systems, instructions to deploy the virtualized appliances on the available host computers.

2. The method of claim 1,
    wherein the model of the distributed computer program application includes one or more multicast chains describing a flow for a data stream from at least the first application to at least the second application.

3. The method of claim 1, further comprising:
    sending, from the orchestration system, to the SDN controller, a first model of the distributed computer program application;
    receiving, at the orchestration system, from the SDN controller, a first updated model of the distributed computer program application;
    in response to receiving, at the orchestration system, the first updated model of the distributed computer program application, determining, at the orchestration system, that the orchestration system is unable to generate a workflow based on the updated model; and
    in response to determining that the orchestration system is unable to generate a workflow based on the updated model, generating the model of the distributed computer program application.

4. The method of claim 1 further comprising:
    using the SDN controller, in response to determining the one or more host computers at which to host the virtualized appliances, placing a reservation on one or more ports for receiving data from one or more of the virtualized appliances; and
    determining, at the SDN controller, that a period of time has passed since placing a reservation on the one or more ports and, in response, releasing any reservations on any unused ports of the one or more ports.

5. The method of claim 1, further comprising:
    intercepting, at the SDN controller, a request for a virtualized appliance to join a multicast group, the request comprising a multicast label;
    determining, at the SDN controller, that SDN controller cannot support the virtualized appliance on a selected host computer and, in response, sending a message to the orchestration system indicating that the virtualized appliance failed to join the multicast group; and
    generating, at the orchestration system, the model of the distributed computer program application in response to receiving the message from the SDN controller, the model of the distributed computer program application comprising one or more constraints that the selected host computer is not used for the virtualized appliance.

6. The method of claim 1, wherein the model of the distributed computer program application comprises one or more constraints which identify one or more host computers that are able to host one or more applications.

7. The method of claim 1,
wherein the model of the distributed computer program application comprises a model for a multi-cloud system comprising a plurality of cloud management systems, and
wherein sending the instructions to the one or more cloud management systems comprises sending a first set of instructions to a first cloud management system of the one or more cloud management systems for initializing only the virtualized appliances mapped to host computers managed by the first cloud management system and a second set of instructions to a second cloud management system of the one or more cloud management systems for initializing only the virtualized appliances mapped to host computers managed by the second cloud management system.

8. The method of claim 1, wherein determining one or more host computers for the virtualized appliances comprises identifying a set of host computers that comprise required hardware and/or software for running the virtualized appliances.

9. The method of claim 1, wherein determining one or more host computers for the virtualized appliances comprises identifying a set of host computers that have enough available bandwidth to run the virtualized appliances without packet loss.

10. The method of claim 1, the SDN controller being programmed to manage multicast trees in service chains of a professional media workflow and to establish paths in a network, the sources, destinations, and virtualized appliances being associated with the professional media workflow and implementing at least one of a video switcher, a video recorder, or a video mixer.

11. A system comprising:
one or more processors; and
a memory communicatively coupled to the one or more processors and storing instructions which, when executed by the one or more processors, cause performance of:
sending, from an orchestration system to a software-defined networking (SDN) controller, a model of a distributed computer program application representing one or more sources, destinations, and virtualized appliances for initiation by one or more host computers;
determining, using the SDN controller, one or more host computers at which to host the virtualized appliances;
identifying a first host computer, of the available host computers, for executing a first application and a second host computer, of the available host computers, for executing a second application;
generating, at the SDN controller, an updated model of the distributed computer program application, the updated model indicating the one or more host computers at which the virtualized appliances are to be hosted;
sending, from the SDN controller to the orchestration system, the updated model of the distributed computer program application;
generating, at the orchestration system, a mapping of the virtualized appliances to available host computers of the one or more host computers based, at least in part, on the updated model of the distributed computer program application; and
using the mapping of the virtualized appliances to the available host computers, sending, from the orchestration system to one or more cloud management systems, instructions to deploy the virtualized appliances on the available host computers.

12. The system of claim 11, wherein the instructions, when executed by the one or more processors, further cause performance of:
sending, from the orchestration system, to the SDN controller, a first model of the distributed computer program application;
receiving, at the orchestration system, from the SDN controller, a first updated model of the distributed computer program application;
in response to receiving, at the orchestration system, the first updated model of the distributed computer program application, determining, at the orchestration system, that the orchestration system is unable to generate a workflow based on the updated model; and
in response to determining that the orchestration system is unable to generate a workflow based on the updated model, generating the model of the distributed computer program application.

13. The system of claim 11 wherein the instructions, when executed by the one or more processors, further cause performance of:
using the SDN controller, in response to determining the one or more host computers at which to host the virtualized appliances, placing a reservation on one or more ports for receiving data from one or more of the virtualized appliances; and
determining, at the SDN controller, that a period of time has passed since placing a reservation on the one or more ports and, in response, releasing any reservations on any unused ports of the one or more ports.

14. The system of claim 11, wherein the instructions, when executed by the one or more processors, further cause performance of:
intercepting, at the SDN controller, a request for a virtualized appliance to join a multicast group, the request comprising a multicast label;
determining, at the SDN controller, that SDN controller cannot support the virtualized appliance on a selected host computer and, in response, sending a message to the orchestration system indicating that the virtualized appliance failed to join the multicast group; and
generating, at the orchestration system, the model of the distributed computer program application in response to receiving the message from the SDN controller, the model of the distributed computer program application comprising one or more constraints that the selected host computer is not used for the virtualized appliance.

15. The system of claim 11, wherein the model of the distributed computer program application comprises one or more constraints which identify one or more host computers that are able to host one or more applications.

16. The system of claim 11,
wherein the model of the distributed computer program application comprises a model for a multi-cloud system comprising a plurality of cloud management systems, and
wherein sending the instructions to the one or more cloud management systems comprises sending a first set of instructions to a first cloud management system of the one or more cloud management systems for initializing only the virtualized appliances mapped to host computers managed by the first cloud management system and a second set of instructions to a second cloud management system of the one or more cloud management systems for initializing only the virtualized appliances mapped to host computers managed by the second cloud management system.

17. The system of claim 11, wherein determining one or more host computers for the virtualized appliances comprises identifying a set of host computers that comprise required hardware and/or software for running the virtualized appliances.

18. The system of claim 11, wherein determining one or more host computers for the virtualized appliances comprises identifying a set of host computers that have enough available bandwidth to run the virtualized appliances without packet loss.

19. The system of claim 11, the SDN controller being programmed to manage multicast trees in service chains of a professional media workflow and to establish paths in a network, the sources, destinations, and virtualized appliances being associated with the professional media workflow and implementing at least one of a video switcher, a video recorder, or a video mixer.

20. The system of claim 11, wherein the model of the distributed computer program application includes one or more multicast chains describing a flow for a data stream from at least the first application to at least the second application.

* * * * *